(12) United States Patent
Zhang

(10) Patent No.: US 6,780,328 B1
(45) Date of Patent: Aug. 24, 2004

(54) FLUID PURIFICATION DEVICES AND METHODS EMPLOYING DEIONIZATION FOLLOWED BY IONIZATION FOLLOWED BY DEIONIZATION

(76) Inventor: Li Zhang, 26 Smith St., Westborough, MA (US) 01581

( * ) Notice: Subject to any disclaimer, the term of this patent is extended or adjusted under 35 U.S.C. 154(b) by 0 days.

(21) Appl. No.: 09/446,471
(22) PCT Filed: Jun. 19, 1998
(86) PCT No.: PCT/US98/12823
§ 371 (c)(1),
(2), (4) Date: Mar. 24, 2000
(87) PCT Pub. No.: WO98/58727
PCT Pub. Date: Dec. 30, 1998

Related U.S. Application Data
(60) Provisional application No. 60/050,376, filed on Jun. 20, 1997.

(51) Int. Cl.[7] .......................... B01D 15/00; C02F 1/72
(52) U.S. Cl. ...................... 210/663; 210/758; 210/759; 210/760; 210/763; 210/195.1; 210/257.1; 204/259; 205/746
(58) Field of Search ................................ 210/652, 663, 210/758, 759, 669, 763, 195.1, 257.2; 204/529, 539, 630, 634; 205/746; 430/399

(56) References Cited

U.S. PATENT DOCUMENTS

| | | | |
|---|---|---|---|
| 3,870,033 A | 3/1975 | Faylor et al. | |
| 4,160,727 A | 7/1979 | Harris, Jr. | |
| 4,280,912 A | 7/1981 | Berry, III et al. | 210/662 |
| 4,430,226 A | 2/1984 | Hegde et al. | 210/638 |
| 4,574,049 A * | 3/1986 | Pittner | |
| 4,724,079 A * | 2/1988 | Sale et al. | |
| 4,863,608 A | 9/1989 | Kawai et al. | 210/638 |
| 5,116,509 A * | 5/1992 | White | |
| 5,156,739 A * | 10/1992 | Dawson et al. | |
| 5,766,479 A * | 6/1998 | Collentro et al. | |
| 5,811,012 A * | 9/1998 | Tanabe et al. | |
| 5,833,846 A * | 11/1998 | Tanabe et al. | |
| 6,030,535 A * | 2/2000 | Hayashi et al. | |
| 6,187,201 B1 * | 2/2001 | Abe et al. | |

* cited by examiner

*Primary Examiner*—Ana Fortuna
(74) *Attorney, Agent, or Firm*—McDermott Will & Emery LLP

(57) ABSTRACT

The invention provides the continuous, integrated methods and devices for substantially removing ionized and ionizable carbon compounds from an aqueous stream by first deionization step to produce a first product stream, ionizing nonionized and nonionizable carbon compounds in such stream to form further ionized and ionizable compounds, and removing the latter by a second deionization step. The method can be performed for example in an apparatus including an EDI unit (10), an ionizing unit (60), and EDI unit (100).

19 Claims, 3 Drawing Sheets

FLUID PURIFICATION DEVICES AND METHODS EMPLOYING DEIONIZATION FOLLOWED BY IONIZATION FOLLOWED BY DEIONIZATION

This is application claims the benefit of provisional application No. 60/050,376 filed Jun. 20, 1997.

This invention relates to fluid purification using deionization and ionization processes and devices. More specifically, the invention relates to the substantial removal of carbon compounds from water by such processes and devices.

BACKGROUND OF THE INVENTION

Electrodialysis (ED), electrodeionization (EDI) and related methods and devices were initially developed during the 1950s, and have since that time been improved to the point that such systems are commonly employed to purify fluids for a variety of applications. In general, ED, EDI, and related methods and devices purify fluids through electric field-mediated transfer of ions through membranes from diluting Streams passing through "less concentrated", ion depeleting compartments to concentrating or brine streams passing through "more concentrated", ion concentrating compartments. Generally, anion transfer (i.e. cation rejecting) and cation transfer (i.e. anion rejecting) membranes are alternated in ED and EDI methods and devices, the membranes being placed between an anode (positive electrode) and a cathode (negative electrode) across which a DC electric field is applied transverse to the fluid flow directions. Anion transfer membranes allow passage only of low molecular weight negatively charged species (anions), and cation transfer membranes allow passage only of low molecular weight positively charged species (cations). Transfer of ions across membranes is mediated by the attraction of the anions to the positively charged anode and the cations to the negatively charged cathode. The combination of an anode, a cathode, and the alternating anion and cation transfer membranes there between is commonly referred to as an ED or EDI "stack". Such stacks may also include cation or anion transfer membranes alternating with substantially non-ion-selective membranes, that is membranes which are not substantially selective for either anions or cations.

EDI differs from ED in that one or more EDI compartments formed by membranes include ion exchange media. The media, typically in the form of resin fibers, fabrics, beads or granules, is present in diluting compartments and sometimes also in concentrating compartments of an EDI device. An EDI compartment may contain either cation exchange resins, anion exchange resins, or a random or structured combination of cation exchange resins and anion exchange resins. The resins reside in the space between alternating anion and cation transfer membranes. In response to the transverse DC electric field, ions are transferred, for example, from diluting to concentrating compartments via the diluting compartment resins and adjacent membranes. The resins form a conductive bridge for movement of ions associated therewith to the ion exchange membranes and thus out of the diluting compartment. The resin facilitates mass transfer of ions by increasing the area available for mass transfer and by decreasing the distance in solution that the ions must travel in order to be removed from the diluting compartment, thus reducing the electrical resistance of the unit, especially in the diluting compartment. In EDI, as the product becomes more pure, the electric field splits water to hydrogen and hydroxide ions which continuously regenerate the membranes and the resins at least in part. The main advantages of EDI processes include continuous operation; stable product quality; the ability to produce high purity product without requiring periodic chemical regeneration; and reduced amounts of waste products.

One area in which EDT technology is gaining momentum is production of ultrapure makeup water for electric power plants. EDI was initially used in the electric power industry in 1991, and since that time more than 50 EDI devices have been installed in such plants. In these plants, EDI has partially or completely replaced the prior conventional (i.e. chemically regenerated) ion exchange resin beds, resulting in substantial operating cost savings. For example, ion exchange units are frequently used to purify blowdown (waste water) for recycling, requiring frequent regeneration, consuming large volumes of acid and caustic, and necessitating constant maintenance. Such exhaustion (degeneration) and regeneration can also result in variations in demineralization performance, thus affecting reliability of use. With the advent of EDI systems, deionization and regeneration are simultaneous and continuous, and problems associated with periodic regeneration are no longer present.

EDI is highly efficient in removing a substantial variety of ions from water. Strongly ionized substances such as sodium, calcium, magnesium, chloride, fluoride and sulfate are examples of ions which are routinely substantially completely removed from water using multi-step purification systems which include one or more EDI units. Weakly ionizable species such as $CO_2$, silica, boric acid and ammonia may also be removed using EDI. Similarly, ethanolamine (ETA) and methoxypropylamine (MPA) are also readily removed by EDI. However, complete removal of non-ionized and non-ionizable organic substances such as ethanol and glyoxal, is not as easily accomplished.

U.S. Pat. No. 5,116,509 discloses use of an ultraviolet (UV) treatment step for deionized tap water prior to EDI treatment, but fails to teach or to suggest a system which processes such tap water water initially containing non-ionized or non-ionizable carbon compounds in addition to ionic or ionizable organic species. "Substantially complete removal" of total organic carbon (TOC) is purported to have been obtained using the system of U.S. Pat. No. 5,116,509. The patent teaches that following an initial deionization, organic species may be added to the deionized tap water and applied UV may break down the added organic species into smaller molecules, some of which are ionic and/or ionizable, allowing subsequent EDI to achieve the claimed TOC reduction. When some part of the added organic species is already in ionic and/or ionizable form, the claims for such a process may not be totally true, however. Although UV may convert non-ionizable organic species into ionic and/or ionizable organic species, UV may also convert ionic and/or ionizable organic species into non-ionizable organic species. If a significant amount of the organic species is in ionic and/or ionizable forms, application of UV may increase the concentration of non-ionizable organic species in the subsequent EDI feed, and may result in a lower organic carbon reduction than without UV. Further, the ionic or ionizable organic species may absorb UV further reducing UV available for converting non-ionizable organic species into ionic or ionizable organic species.

A need remains, therefore, for additional methods and devices capable of obtaining improved purity product from purification systems. In particular, additional methods and devices are needed which can remove non-ionized or non-ionizable carbon compounds in multi-step purification systems.

SUMMARY OF THE INVENTION

The invention is directed to methods and devices for removing substantially all inorganic and organic carbon compounds from water. In accordance with the present invention, one or more first deionization stages remove ionic and/or ionizable contaminants. The product stream of such first deionization stages is exposed to an organic carbon bond-breaking agent prior to becoming the feed stream of one or more second deionization stages. Such exposure causes non-ionized organic carbon compounds in the first deionization product stream to ionize or become ionizable, facilitating removal in such second deionization stages. Further, since ionic and/or ionizable contaminants are substantially removed in the first deionization stages, the amount of bond breaking agent required to convert the non-ionizable organic carbon compounds to ionic or ionizable organic carbon compounds is minimized.

In accordance with the invention, such first one or more deionization stages remove the ionic and/or ionizable inorganic and organic carbon species. The effluent from such first deionization stages is exposed to organic carbon bond-breaking agents, such as UV (preferably 184.9 nm wavelength or less) including catalyzed UV and/or other oxidizing agents (e.g., oxygen, ozone, singlet oxygen, hydrogen peroxide, hydroxide radical, means to produce singlet oxygen or hydroxide radical or combinations thereof). These agents break down organic carbon compounds from such first deionization stages. With the subject invention, it is not necessary to provide a level of UV energy sufficient to break down organic components all the way to $H_2O$ and $CO_2$, but rather it is sufficient to break down those components into compounds which may be removed in subsequent removal stage(s).

In one embodiment, the invention provides a method of removing inorganic and organic carbon contaminants from water. The method involves the steps of: flowing such water through one or more first removal units to produce a first product stream having less organic carbon compounds; exposing such first product stream for a predetermined time to an organic carbon bond-breaking agent (preferably at a predetermined temperature) sufficient to produce a second product stream containing at least a portion of the remaining organic carbon compounds in an ionized or ionizable form; and flowing such second product stream containing such organic carbon compounds in ionized or ionizable form through one or more second removal units, wherein such organic carbon compounds in ionized or ionizable form are substantially removed. Such removal units may be independently selected from reverse osmosis (RO), nanofiltration (NF), electrodialysis (ED), electrodeionization (EDI), filled cell electrodialysis, and electrodiaresis devices; chemically or electrically regenerable ion exchange (IX) systems; and activated carbon and other sorbent beds.

In another embodiment, the invention provides a device for removing organic carbon compounds from water. The device involves: a first electrodeionization (EDI) unit having at least one diluting compartment extending in fluid communication between a first feed stream inlet and a first product stream outlet; a second EDI unit having at least one diluting compartment extending in fluid communication between a second feed stream inlet and a second product stream outlet; a fluid flow path coupling the first product stream outlet and the second feed stream inlet; and an ionizing unit for exposing a fluid flowing along such fluid flow path to at least one organic carbon bond-breaking agent thereby providing substantial removal of organic carbon compounds in the second deionization unit.

It will be understood that such second stages for removing ionized and/or ionizable carbon species may in fact be the same device as that used for the first stage for removing such species. For example, the fluid may be contacted with one or more first stages for removing ionized and/or ionizable carbon species, then contacted with such an organic carbon bond-breaking device and subsequently recycled to such first stages for removing ionizable and/or ionized carbon species. Such combination of bond-breaking and removal devices may operate on batch or on feed-and-bleed continuous bases.

In yet another embodiment, the invention provides a method for removing both ionizable and/or ionized carbon compounds, and non-ionized and/or non-ionizable carbon compounds from water. The method involves the steps of (a) processing a first stream of the water with a removal apparatus for removing ionized and/or ionizable carbon compounds from the water to produce a first product stream; (b) contacting the first product stream with an agent for converting non-ionized and/or non-ionizable carbon compounds into ionized and/or ionizable carbon compounds to form a second product stream; (c) processing the second product stream with a second removal apparatus for removing ionized and/or ionizable carbon compounds from the water to form a third product stream; and (d) recovering the third product stream from step (c). In alternative embodiments, the method includes the steps of recovering the first product stream from step (a) and recovering the second product stream form step (b).

In still another embodiment, the invention provides a device for removing both ionizable and/or ionized carbon compounds, and non-ionized and/or non-ionizable carbon compounds from water. The device involves (a) a first removal means for removing ionized and/or ionizable carbon compounds from the water to produce a first product stream; (b) a conversion means for converting non-ionized and/or non-ionizable carbon compounds in the first product stream into ionized and/or ionizable carbon compounds to form a second product stream; © a second removal means for removing ionized and/or ionizable carbon compounds from the second product stream to form a third product stream; and (d) a recovery means for recovering the third product stream. In alternative embodiments, the device also includes a second recovery means for recovering the first product stream and a third recovery means for recovering the second product stream.

It will also be understood that "organic carbon in an ionized or ionizable form" includes carbon dioxide, bicarbonate and/or carbonate which results from the bond-breaking of an organic carbon species.

As used herein, the term "ionizable" as in, for example, organic carbon in an ionizable form, refers to organic carbon which can be ionized by proximity to the surface of ion exchange media.

BRIEF DESCRIPTION OF THE DRAWING

The foregoing and other objects of the invention, the various features thereof, as well as the invention itself, may be more fully understood from the following description, when read together with the accompanying drawings in which.

DETAILED DESCRIPTION OF SOME PREFERRED EMBODIMENTS

Figure 1:
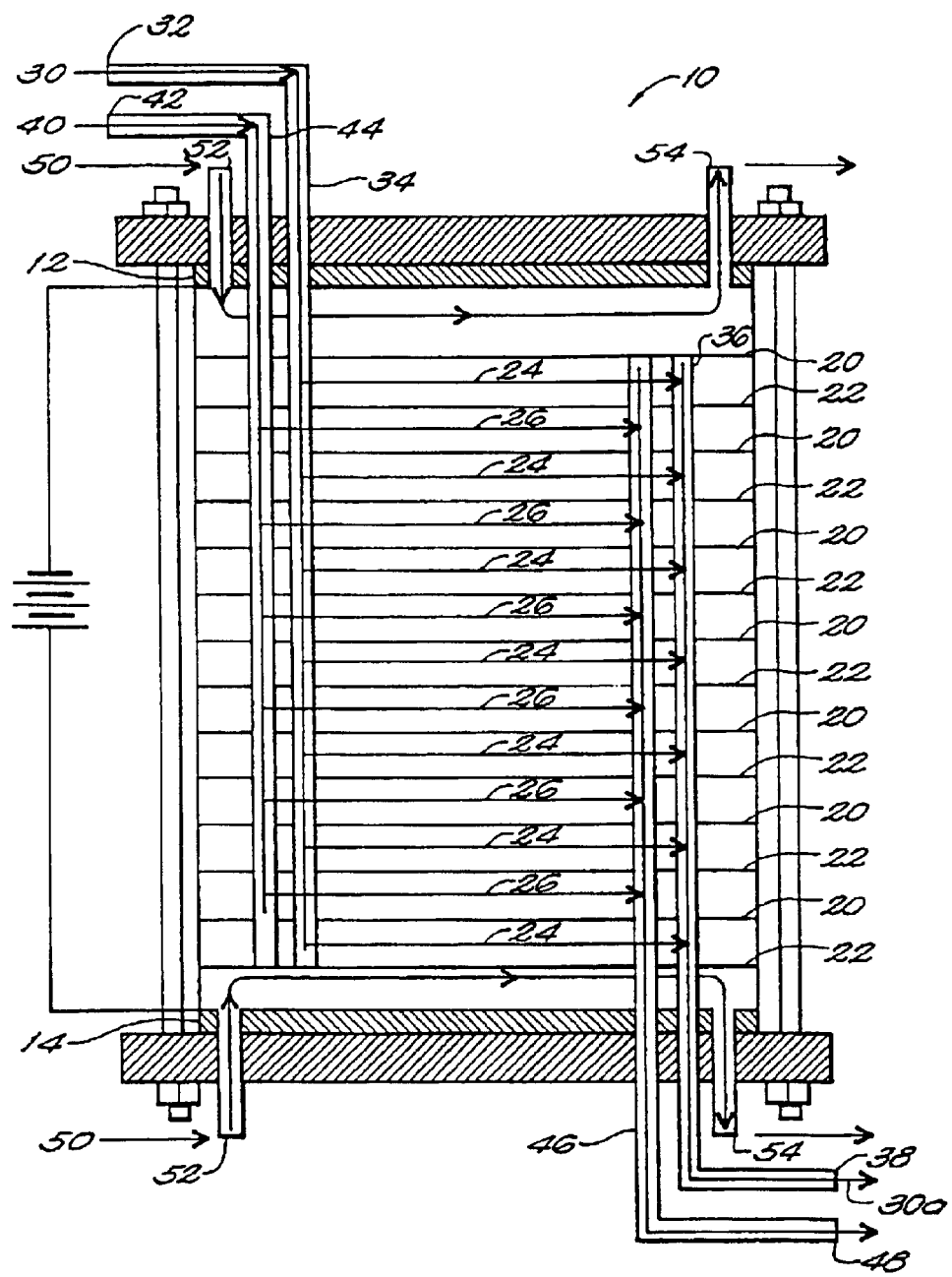
FIG. 1 is a schematic diagram of an electrodeionization device (prior art)

In accordance with the invention, inorganic and organic carbon compounds are substantially removed from water using a two-stage deionization device, having an organic carbon ionizing unit interposed between the two stages in such a way that the product stream of the first deionization stage is exposed to one or more organic carbon bond-breaking agents. At least some organic carbon compounds in the product stream of the first stage are ionized or rendered ionizable prior to transfer to the feed stream of the second deionization stage. Alternatively, after exposure to one or more carbon bond-breaking agents, the ionized or ionizable stream is recycled back to the first deionization stage.

The term "conversion agent", as defined herein, refers to an agent capable of converting non-ionized and nominally non-ionizable carbon compounds to ionized and ionizable compounds. Conversion agents include bond-breaking agents such as oxidizing and reducing agents. Examples of oxidizing agents include chemical oxidizing agents, electrolytic oxidizing agents, thermal oxidizing agents (heat), radiation and/or catalysts, and combinations thereof. Preferably, the oxidation agent includes ultraviolet (UV) radiation. More preferably, the UV radiation is characterized by wavelengths of about 184.9 nm or less wave lengths. Such radiation can be used in conjunction with a catalyst such as titanium dioxide. Alternatively, more preferably the UV radiation is characterized by wavelengths of about 254 nm and used in conjunction with a catalysts, such as, for example, titanium dioxide.

The term "deionization", as used herein, refers to devices and associated methods for removing ionizable and/or ionized organic carbon and other ionizable and/or ionized compounds from fluids for purification purposes. Exemplary deionization devices and methods include reverse osmosis (RO), nanofiltration (NF), electrodialysis (ED), electrodeionization (EDI), filled cell electrodialysis, and electrodiaresis devices; chemically or electrically regenerable ion exchange (IX) systems; and activated carbon and other sorbent beds. The ion exchange systems may be liquid or solid, organic or inorganic.

The term "substantial removal" of organic carbon compounds, as used herein, refers to the removal of organic carbon compounds in the range of about 50% to about 100%, and preferably in the range of about 70% to about 100%, and most preferably in the range of about 80% to about 100%.

The methods and devices disclosed herein may be used per se, or they may be combined with other purification means to optimize the purity and cost of the effluent product. Performance of any purification system may be improved using the methods and devices of the present invention, whether the disclosed system is used as a part of a multi-step purification system, or is used alone. The performance of multi-step purification systems i.e., systems in which a variety of purification methodologies are employed, is particularly improved using the methods and devices of the present invention.

The present invention is described in terms of a two-stage deionization system which includes two EDI units. It should be understood, however, that other types of deionization devices such as reverse osmosis, nanofiltration. ED, filled cell ED and electrodiaresis devices; activated carbon or other sorbent devices; and/or chemically or electrically regenerable ion exchange resin systems can also be substituted for one or both EDI units described herein. Further, each stage may consist of two or more deionization units in series and/or in parallel.

FIG. 1 depicts a schematic view of an EDI unit 10 known in the art, having a cathode 12 and an anode 14 and a plurality of cation transfer membranes 20 alternating with anion transfer membranes 22. Cation transfer membranes 20 and anion transfer membranes 22 form alternating diluting compartments 24 and concentrating or brine compartments 26. Either or both of the diluting compartments 24 and concentrating or brine compartments 26 are filled with ion exchange resins. The diluting compartments 24 may be filled with an ion exchange resin, a mixture of anion and cation exchange resins or with layers of such resins. A fluid, preferably water containing salt, enters unit 10 at electrode stream inlets 52 and exits unit 10 at electrode stream outlets 54 to form electrode streams 50.

Fluid to be purified flows into EDI unit 10 in the form of feed stream 30 which enters the unit at inlet 32. Feed stream inlet 32 is in fluid communication with feed stream inlet manifold 34, through which fluid to be purified is delivered to one or more diluting compartments 24. The number of diluting compartments 24 in an EDI unit may vary according to the application in which the unit is used. Determinations of the appropriate number of diluting compartments for a particular application may be accomplished empirically, on the basis of the desired flow and deionization capacity of the fluid purification system and the amount and identity of contaminants in the feed stream. As defined herein, diluting compartment 24 of unit 10 involves the sum, collectively, of all diluting compartments contained within the unit. After traversing the diluting compartment 24, fluid from feed stream 30 enters product stream outlet manifold 36, exiting the unit as product stream 30a at product stream outlet 38. Fluid is purified in diluting compartments 24 by virtue of passage of ions out of such diluting compartments into the concentrating or brine compartments 26.

A concentrate or brine influent 40 flows into unit 10 at concentrate or brine stream inlet 42. Concentrate or brine stream inlet 42 is in fluid communication with concentrate or brine stream inlet manifold 44, through which fluid that receives ions from the diluting compartments 24 is delivered to one or more concentrating or brine compartments 26. The number of concentrating or brine compartments in an EDI unit may vary according to the application in which the unit is used, but will be equal to (or±1) the number of diluting compartments in the unit. As defined herein, concentrating or brine compartment 26 of unit 10 involves the sum, collectively, of all concentrating or brine compartments contained within the unit. After traversing concentrating compartment 26, fluid from concentrate or brine influent 40 enters concentrate or brine stream outlet manifold 46, exiting the unit at EDI concentrate or brine stream outlet 48. After exiting from concentrate or brine stream outlet 48, a portion of the brine stream may be discarded as "blowdown", and the remainder recycled into concentrate or brine influent 40, upstream of brine stream inlet 42.

Figure 2:
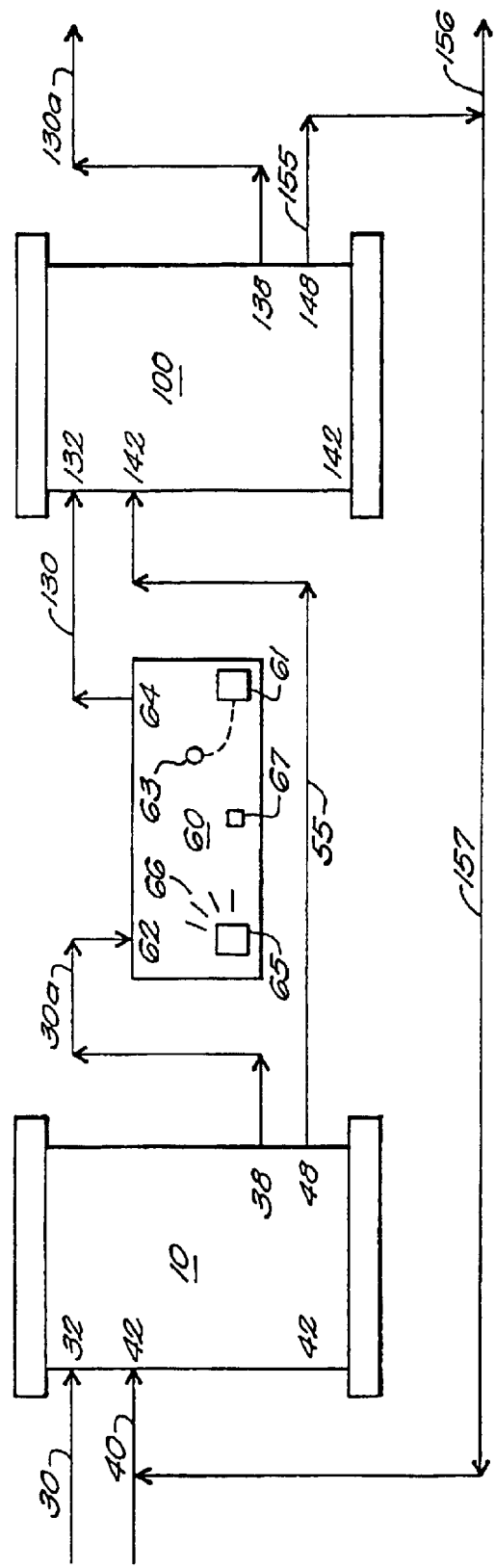
FIG. 2 is a schematic depiction of one embodiment of the apparatus of the invention.

FIG. 2 shows an embodiment of the device of the invention in which feed stream 30 flows into first EDI feed stream inlet 32 and out of first EDI product stream outlet 38, as deionized product 80, described in detail above. Product stream 30a then flows into ionizing unit 60 via ionizing unit inlet 62.

Different bond-breaking agents can be used in the ionizing unit 60 to ionize organic species in product stream 30$a$ in accordance with the invention. For example, the ionizing unit 60 can include an element 61 for adding a bond-breaking agent 63 to the product stream 30$a$. Such bond-breaking agents 63 can include, but are not limited to, chemical oxidizing agents capable of generating oxidizing free radicals when added to product stream 30$a$. Many compounds capable of generating oxidizing free radicals known to those of ordinary skill in the art such as, for example, peracetic acid and persulfate compounds, are suitable as ionizing agents in accordance with the invention. Compounds which ultimately yield only water or readily removable innocuous byproducts are preferred. For example, oxygen, singlet oxygen, ozone or hydrogen peroxide, or combinations thereof, are particularly suitable as oxidizing free radical generating compounds. Such oxidizing agents can be used in conjunction with catalysts, preferably insoluble catalysts such as finely divided supported platinum or platinum group metals, oxides of these metals or other compounds containing these metals.

Bond-breaking agents 63 which can be used in ionizing unit 60 for ionizing product stream 30$a$ in accordance with the invention also include electrolytic oxidizing agents. Non-limiting examples of such electrolytic oxidizing agents include lead oxide or tin oxide anodes. Other electrolytic oxidizing agents known to those of ordinary skill in the art can also be used for oxidizing product stream 30$a$.

Further bond-breaking agents 63 which can be used in accordance with the invention include catalytic oxidizing agents. Product stream 30$a$ can be contacted with a catalyst rich surface including rare earth catalysts, or platinum catalysts.

Ionizing unit 60 can further include an element 65 for exposing the product stream 30$a$, including non-ionized and/or non-ionizable organic species, to a bond-breaking agent 63 such as radiation 66. Any kind of radiation 66 is suitable as a bond-breaking agent 63, so long as the radiation is of sufficient energy to break down at least a portion of the non-ionized or non-ionizable organic species to yield ionized species. Preferably UV radiation is used. More preferably, the UV radiation used is in the range of from about 160 nm to about 260 nm. Most preferably, the UV radiation is characterized by wavelengths of about 184.9 nm or less. UV catalysts, such as titanium dioxide may be used in conjunction with such radiation. Alternatively, most preferably UV radiation characterized by wavelengths of about 254 nm is used in conjunction with catalyst such as, for example, titanium dioxide. UV radiation, with or without catalyst, may be used in the absence of other oxidizing agents provided the concentration of organic carbon compounds is low e.g., 1 ppm or less. Suitable sources of UV include low, medium or high pressure mercury arc lamps; doped mercury are lamps; incoherent or coherent excimer lamps such as, for example, Xenon(172 nm), Argon chloride (175 nm), Argon fluoride (193 nm), Krypton chloride (222 nm), Krypton fluoride (249 nm) and other gas discharge lamps. It is preferred such sources include a substantial amount of radiation in the range of about 160 nm to about 260 nm.

Ionizing unit 60 can also include an element 67 for heating the product stream 30$a$ to oxidize the non-ionized or non-ionizable organic carbon species of product stream 30$a$ to form ionizable species. In such an embodiment, heat serves as a thermal oxidizing agent.

Exposure to the bond-breaking agent occurs for a predetermined time period ranging from about 1 second to about 100 minutes, and at a temperature (which may be a predetermined) ranging from about 5° C. to about 400° C., depending upon the type of bond-breaking agent employed and thus refractoriness of the organic species. Different bond-breaking agents, such as those exemplary agents exemplified above, can be used alone or in various combinations of two or more, with or without catalysts and/or carriers and/or supports.

After exposure to the bond-breaking agent 63, product stream 130 exits ionizing unit 60 through ionizing unit outlet 64 and flows into the second EDI unit 100 via feed stream inlet 132. Organic carbon compounds which have been oxidized to ionized or ionizable compounds by ionizing unit 60 will be removed in the diluting stream of second EDI unit 100. Thus, second product stream 130$a$ exits such second EDI unit 100 though product stream outlet 138 substantially free of organic carbon species. Alternatively, product stream 130 is recycled back to EDI unit 10 and into feed stream 30 via loop 159.

The EDI units of FIG. 2 may share a common concentrate stream in parallel or series via the loop formed from concentrate influent 40 through the first EDI concentrating compartment to first concentrate stream outlet 48 thus forming first concentrate effluent 55, which subsequently flows through second concentrate stream inlet 142 through the second EDI concentrating compartment to second concentrate stream outlet 148 thus forming second concentrate effluent 155 (brine). A portion of second concentrate effluent 155 may be discarded as blowdown stream 156 (brine blowdown), and the remainder recycled into concentrate influent 40 via loop 157 (brine makeup).

EDI unit 100 may be completely independent of EDI unit 10 or both units may reside in the same EDI stack, even between the same pair of electrodes. EDI units 10 and 100 may also consist of two or more EDI devices in series and/or in parallel. Each of such devices may also reside in a single EDI stack, even between the same pair of electrodes. ED and EDI devices may be similarly combined.

In one exemplary embodiment, a conventional type EDI unit 100 can be modified to incorporate partway along the stack an isolator and plumbing to establish two sub-stacks, each with their own separate inlet and outlet manifolds. The outlet manifold of the diluting compartments of the first sub-stack communicates via a coupler with the inlet manifold of the diluting compartments of the second sub-stack. Such a coupler provides the bond-breaking agent, such as, for example, UV radiation, for converting the non-ionized or non-ionizable organic carbon compounds to ionic or ionizable organic carbon compounds. Thus, this exemplary embodiment including, inter alia, the two sub-stacks and the coupler providing the bond-breaking agent forms an integrated system which can be operated on a integrated, continuous basis.

Those of skill in the art will recognize that a wide variety of configurations are available for the concentrate streams of multistage EDI device. Any concentrate stream configuration may be used in accordance with the present invention.

The following examples illustrate preferred modes of making and practicing the invention, but are not meant to limit the scope of the invention, since alternative methods may be employed to obtain similar results.

EXAMPLE 1

A 60 cell pair electrodeionization (EDI) stack (40"×20") having a 20 gallon per minute capacity (available from Ionics, Incorporated, Watertown, Mass.) is placed in fluid communication with a portion of a waste stream of a steam generator. A 10 µcartridge filter is placed upstream of the EDI unit to remove particulate materials. Fluid is pumped into the EDI unit diluting streams by a pressure regulated feed pump. Brine is circulated through the EDI unit by a brine pump. The EDI unit removes, inter alia. ionized and ionizable carbon compounds but not non-ionized and non-ionizable carbon compounds. The EDI product is pumped through an ionizing unit including a low pressure mercury arc element for exposing the EDI product to UV radiation including 184.9 nm, and into a regenerated mixed ion exchange (IX) resin deionizing bed. EDI brine conductivity, deionized product resistivities and temperatures are measured using on-line conductivity meters (Thornton 770, Waltham, Mass.). Feed and brine pH are measured using a handheld pH meter (HYDAC). Organic carbon compounds in the form of ethanolamine (ETA) and methoxypropylamine (MPA) are measured using an organic carbon compound analyzer (Model DC-180, Dohrmann) and independently by NWT Corporation, San Jose, Calif.

Figure 3:
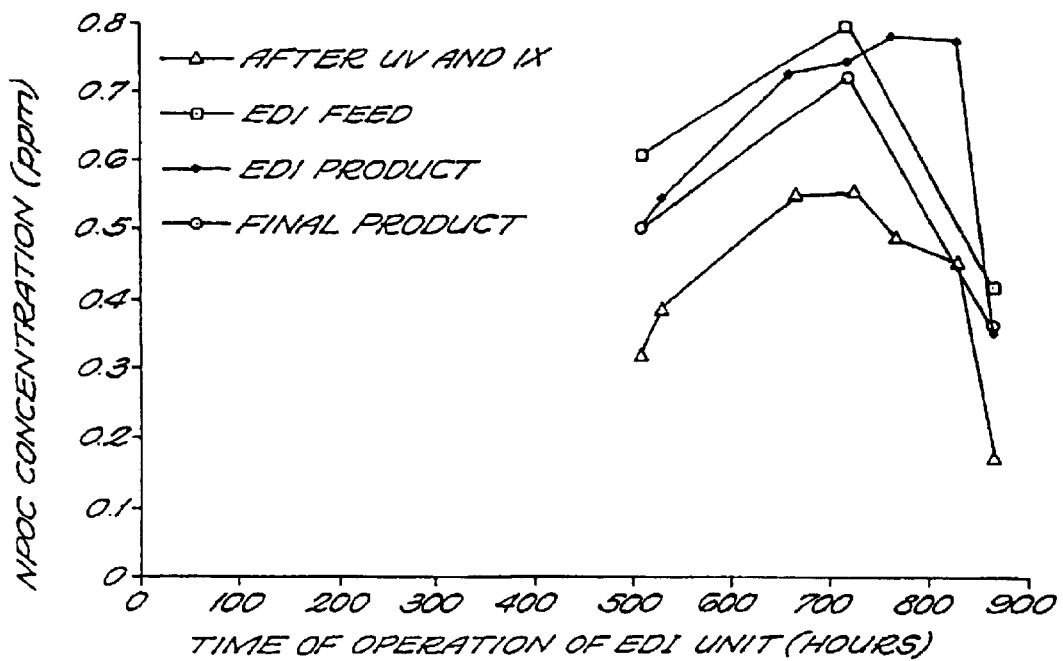
FIG. 3 is a graph showing removal of organic carbon compounds from a product stream of a purification system applied to a waste stream of a steam generator, according to an embodiment of the invention.

In FIG. 3, approximate concentrations in parts per million (ppm) of the organic carbon compounds of the EDI unit feed stream "■", the EDI unit product stream "♦", the product stream from the EDI unit in sequence with the IX resin bed "X", and the product stream from the EDI unit in sequence with the ionizing unit followed by the IX resin bed "▼" (after UV and IX), are plotted against the time of operation of the EDI unit (hours). In this figure, the UV and IX system provides measurements made in accordance with the present invention. FIG. 3 demonstrates that the UV and IX system produces a product stream containing approximately 54% less organic carbon compounds that the product stream of the deionization systems including the EDI unit alone, or the EDI unit in sequence with an ion exchange resin bed without an intermediate organic carbon compound ionizing step. The mixed bed ion exchange unit may be replaced by an EDI (or other ionized and ionizable carbon compound removal) unit producing similar results.

EXAMPLE 2

A split stream of a closed loop water system can be treated by the two-stage deionization device of the invention. In a closed loop, thermal breakdown of ionizable organic species may create some non-ionized and/or non-ionizable organic carbon compounds at a constant rate (r). The application of the deionization-ionization-deionization device of the invention can maintain the loop organic carbon concentration (C) at a low level. Where the split stream flow rate is F, the water recovery rate of the deionization-ionization-deionization device is q, and the organic carbon compound rejection rate by the device is R, then the steady state concentration of the organic carbon can be calculated according to the following equation:

$$r = FC(1-q+R)$$

For example, in the case where the generation rate of non-ionized and non-ionizable organic carbon is 1984 ppb-gpm, the split stream flow rate is 100 gpm, and the water recovery rate is 95%, then the loop organic carbon concentration is determined in accordance with the relation:

$$C = \frac{1984 \; ppb\text{-}gpm}{100 \; gpm(1 - 0.95 + R)}$$

Figure 4:
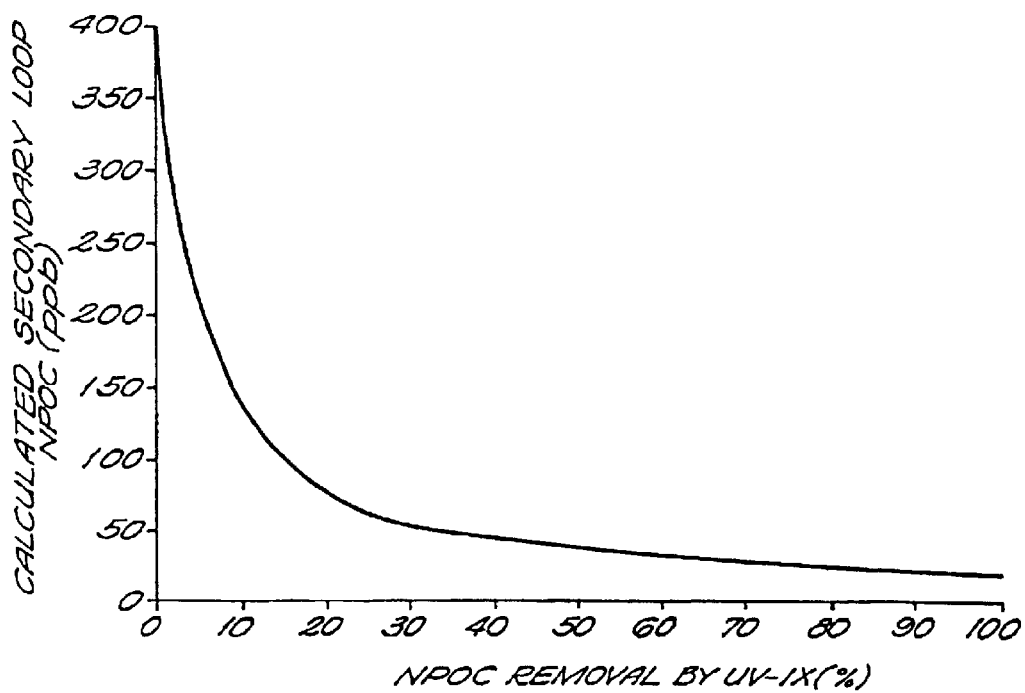
FIG. 4 is a representative curve showing calculated concentrations of organic carbon compounds removed from a steam generator water circulation loop, according to an embodiment of the invention.

Thus, when R=0, i.e., no removal of organic carbon occurs, then the steady state organic carbon concentration C=396.8 ppb. When R=0.25, then C=66.1 ppb; and when R=0.54, then C=33.6 ppb. FIG. 4 is a representative curve generated in this manner to predict closed loop organic carbon concentration in accordance with the invention.

Although a few exemplary embodiments of this invention have been described in detail above, those skilled in the art will readily appreciate that many modifications are possible in the exemplary embodiments without materially departing from the novel teachings and advantages of this invention. For example, a variety of ionizing devices and/or methods may be used to ionize organic species which exist in the product of the first deionizing device. Accordingly, all such modifications are intended to be included within the scope of this invention as defined in the following claims.

What is claimed is:

1. A method for purifying water, wherein the water contains both (i) ionizable and/or ionized organic carbon compounds and (ii) non-ionized and/or non-ionizable organic carbon compounds, such method comprising the steps of:

(a) processing a first stream of the water with a deionization apparatus to remove from the water ionized organic carbon compounds and certain organic compounds that are ionizable in said deionization apparatus, wherein at least some of such ionized and/or the certain ionizable organic carbon compounds are susceptible to conversion to non-ionized and/or non-ionizable organic carbon compounds by an agent intended for converting non-ionized and/or non-ionizable organic compounds into ionized and/or ionizable organic compounds, thereby producing a first product stream containing a smaller concentration of ionized and/or ionizable organic carbon compounds including the certain organic compounds, than the first stream;

(b) immediately following step (a), contacting the first product stream with said agent for converting non-ionized and/or non-ionizable organic carbon compounds into ionized and/or ionizable organic carbon compounds at a time and a temperature sufficient to form a second product stream containing a smaller concentration of non-ionized and/or non-ionizable organic carbon compounds than the first stream and a larger concentration of ionized and/or ionizable organic carbon compounds than the first product stream;

(c) processing the second product stream with a second deionization apparatus, which differs from said first deionization apparatus, for removing ionized and/or ionizable organic carbon compounds from the water to form a third product stream containing a smaller concentration of ionized and/or ionizable organic carbon compounds and of non-ionized and/or non-ionizable organic carbon compounds than the first stream; and (d) recovering the third product stream from step (c), wherein each of said first deionization apparatus and said second deionization apparatus is selected from the group consisting of electrodeionization apparatus, electrodialysis apparatus, filled cell electrodialysis apparatus and electrodiaresis apparatus.

2. A method according to claim 1, wherein the agent is selected from the group consisting of an oxygen, ozone, singlet oxygen, hydrogen peroxide, chemical oxidizing agent, electrolytic oxidizing agent, electrochemical oxidizing agent, catalytic oxidizing agent, thermal oxidizing agent, and radiation and combinations thereof.

3. A method according to claim 2 wherein the agent comprises radiation characterized by wavelengths of about 184.9 nm.

4. A method according to claim 1 wherein the agent comprises ultraviolet radiation.

5. A method according to claim 4 wherein the agent further comprises hydrogen peroxide.

6. A method according to claim 4 wherein the agent further comprises ozone.

7. A method according to claim 4 wherein the agent further comprises a catalyst.

8. A method according to claim 7 wherein the catalyst comprises titanium oxide.

9. A method according to claim 1 wherein the agent comprises ozone and hydrogen peroxide.

10. An apparatus for purifying water, wherein the water contains both (i) ionizable and/or ionized organic carbon compounds and (ii) non-ionized and/or non-ionizable organic carbon compounds from water comprising:

(a) a first deionization means to remove from the water ionized organic carbon compounds and certain organic compounds that are ionizable in said deionization apparatus, wherein at least some of such ionized and/or the certain ionizable organic carbon compounds are susceptible to conversion to non-ionized and/or non-ionizable organic carbon compounds by a conversion means intended for converting non-ionized and/or non-ionizable organic carbon compounds into ionized and/or ionizable organic carbon compounds, thereby producing a first product stream containing a smaller concentration of ionized and/or ionizable organic carbon compounds including the certain organic compounds, than the first stream;

(b) a conversion means for converting non-ionized and/or non-ionizable organic carbon compounds into ionized and/or ionizable organic carbon compounds at a time and a temperature sufficient to form a second product stream containing a smaller concentration of non-ionized and/or non-ionizable organic carbon compounds than the first stream and a larger concentration of ionized and/or ionizable organic carbon compounds than the first product stream, wherein said conversion means is positioned immediately following the deionization apparatus in (a);

(c) a second deionization means, which differs from said first deionization means, for removing ionized and/or ionizable carbon compounds from the water to form a third product stream containing a smaller concentration of ionized and/or ionizable organic carbon compounds and of non-ionized and/or non-ionizable organic carbon compounds than the first stream; and (d) a recovery means for recovering the third product stream;

wherein each of said first deionization means and said second deionization means is selected from the group consisting of electrodeionization apparatus, electrodialysis apparatus, filled cell electrodialysis apparatus and electrodiaresis apparatus.

11. An apparatus according to claim 10 wherein the conversion means comprises contact means for contacting the first product stream with an agent.

12. An apparatus according to claim 11 wherein the agent is selected from the group consisting of a oxygen, ozone, singlet oxygen, hydrogen peroxide, chemical oxidizing agent, electrolytic oxidizing agent, electrochemical oxidizing agent, catalytic oxidizing agent, thermal oxidizing agent, and radiation.

13. An apparatus according to claim 12 wherein the oxidizing agent comprises radiation characterized by wavelengths of about 184.9 nm.

14. An apparatus according to claim 12 wherein the oxidizing agent comprises ultraviolet radiation.

15. An apparatus according to claim 14 wherein the agent further comprises hydrogen peroxide.

16. An apparatus according to claim 14 wherein the agent further comprises ozone.

17. An apparatus according to claim 16 wherein the agent further comprises a catalyst.

18. An apparatus according to claim 12 wherein the catalyst comprises titanium oxide.

19. An apparatus according to claim 11 wherein the agent comprises ozone and hydrogen peroxide.

* * * * *